United States Patent [19]

Gillett, Jr. et al.

[11] Patent Number: 5,068,781
[45] Date of Patent: * Nov. 26, 1991

[54] METHOD AND APPARATUS FOR MANAGING MULTIPLE LOCK INDICATORS IN A MULTIPROCESSOR COMPUTER SYSTEM

[75] Inventors: Richard B. Gillett, Jr., Westford; Douglas D. Williams, Pepperell, both of Mass.

[73] Assignee: Digital Equipment Corporation, Maynard, Mass.

[*] Notice: The portion of the term of this patent subsequent to Aug. 15, 2006 has been disclaimed.

[21] Appl. No.: 372,565

[22] Filed: Jun. 28, 1989

Related U.S. Application Data

[63] Continuation of Ser. No. 44,954, May 1, 1987, Pat. No. 4,858,116.

[51] Int. Cl.⁵ .................. G06F 13/38; G06F 13/42
[52] U.S. Cl. .................. 395/325; 364/240; 364/240.8; 364/240.9; 364/DIG. 1
[58] Field of Search ... 364/200 MS File, 900 MS File

[56] References Cited

U.S. PATENT DOCUMENTS

| | | | |
|---|---|---|---|
| 3,398,405 | 8/1968 | Carlson et al. | 364/200 |
| 3,528,061 | 9/1970 | Zurcher, Jr. | 364/200 |
| 3,665,484 | 5/1972 | Nanba | 364/200 |
| 3,761,883 | 9/1973 | Alvarez et al. | 364/200 |
| 3,916,384 | 10/1975 | Fleming et al. | 364/200 |
| 3,993,981 | 11/1976 | Cassarino et al. | 364/200 |
| 3,997,875 | 12/1976 | Broeren | 364/200 |
| 4,000,485 | 12/1976 | Barlow et al. | 364/200 |
| 4,050,059 | 9/1977 | Williams et al. | 364/200 |
| 4,055,851 | 10/1977 | Jenkins et al. | 364/200 |
| 4,075,692 | 2/1978 | Sorenson et al. | 364/200 |
| 4,099,243 | 7/1978 | Palumbo | 364/200 |
| 4,161,778 | 7/1979 | Getson et al. | 364/900 |
| 4,214,304 | 7/1980 | Shimizu et al. | 364/200 |
| 4,296,466 | 10/1981 | Guyer et al. | 364/200 |
| 4,313,161 | 1/1982 | Hardin et al. | 364/200 |
| 4,315,310 | 2/1982 | Bayliss et al. | 364/200 |
| 4,384,322 | 5/1983 | Bruce et al. | 364/200 |
| 4,407,016 | 9/1983 | Bayliss et al. | 364/200 |
| 4,480,307 | 10/1984 | Budde et al. | 364/200 |
| 4,481,573 | 11/1984 | Fukunaga et al. | 364/200 |
| 4,574,350 | 3/1986 | Starr | 364/200 |
| 4,587,609 | 5/1986 | Boudreau et al. | 310/156 |
| 4,621,318 | 11/1986 | Maeda | 364/200 |
| 4,698,753 | 10/1987 | Hubbins et al. | 364/200 |
| 4,706,190 | 11/1987 | Bomba et al. | 364/200 |
| 4,709,326 | 11/1987 | Robinson | 364/200 |

*Primary Examiner*—David Y. Eng
*Attorney, Agent, or Firm*—Finnegan, Henderson, Farabow, Garrett, and Dunner

[57] ABSTRACT

A computer system having multiple processors interconnected by a pended bus provides exclusive read-modify-write operations employing multiple lock bits. A processor generates an interlock read command which is transmitted as a transfer over the pended bus to a memory or I/O node. Acknowledge confirmations are transmitted by the memory back to the processor two bus cycles after each bus cycle of the processor transfer. The processor transfer, including an interlock read command, is stored in a input queue in memory and processes in turn by the memory. A first interlock read command to a specified memory location causes a lock bit to be set for that location and a first type of response message including the contents of the specified location to be generated by the memory and stored in an output queue. The memory obtains access to the pended bus through an arbitration process and transmits a response message including the contents of the memory location specified in the interlock read command at an unspecified time after initiation of the interlock read command. A subsequent interlock read command from the processor to the same memory location will result in a denial of access to the specified location and in the generation of a second type of response message by the memory which indicates that the specified location is locked.

14 Claims, 9 Drawing Sheets

METHOD AND APPARATUS FOR MANAGING MULTIPLE LOCK INDICATORS IN A MULTIPROCESSOR COMPUTER SYSTEM

This is a continuation of application Ser. No. 07/044,954, filed May 1, 1987, now U.S. Pat. No. 4,858,116 issued Aug. 5, 1989.

CROSS REFERENCES TO RELATED APPLICATIONS

The invention is related to the following copending U.S. Patent Applications assigned to the assignee of the present invention:

METHOD AND APPARATUS FOR INITIATING TRANSACTIONS ON A MULTIPROCESSOR COMPUTER SYSTEM EMPLOYING MULTIPLE LOCK INDICATORS, Ser. No. 07/044,486, filed Apr. 24, 1987;

METHOD AND APPARATUS FOR IMPLEMENTING MULTIPLE LOCK INDICATORS IN A MULTIPROCESSOR COMPUTER SYSTEM, Ser. No. 07/044,466, filed Apr. 24, 1987;

METHOD AND APPARATUS FOR ASSURING ADEQUATE ACCESS TO SYSTEM RESOURCES IN A MULTIPROCESSOR COMPUTER SYSTEM, Ser. No. 07/044,952, filed Apr. 24, 1987 by Richard B. Gillett, Jr. and Douglas D. Williams; and COMMANDER NODE METHOD AND APPARATUS FOR ASSURING ADEQUATE ACCESS TO SYSTEM RESOURCES IN A MULTIPROCESSOR COMPUTER SYSTEM, Ser. No. 07/045,043, filed Apr. 24, 1987, by Richard B. Gillett, Jr. and Douglas D. Williams now abandoned.

BACKGROUND OF THE INVENTION

The invention relates to computer systems and, more particularly, to computer systems having multiple processors interconnected by a pended bus.

Modern computer systems may have multiple processors, memory resources, and input/output (I/O) devices interconnected by a common bus to achieve high total computational power. Such construction can provide very powerful systems capable of executing many millions of instructions per second. However, the interconnection of multiple processors can create difficulties when there is a need to perform an instruction sequence known as a read-modify-write (RMW) operation. In an RMW operation, one processor retrieves data from a memory location, performs an operation on the data, and writes the modified data back to the original memory location. Unpredictable results affecting data integrity can occur if one processor has started an RMW operation for one memory location, and a second processor attempts an RMW operation for the same memory location in the time period between the "read" operation of the first processor's RMW operation and the "write" portion of that RMW operation. One way to prevent multiple processors from performing RMW operations on the same memory locations is to provide an "interlock read" capability. This involves the use of a "lock" indicator, such as a lock bit, which is set when the "read" portion of an RMW operation is performed and which is reset after the "write" portion of the RMW operation is completed. A second processor attempting to initiate an RMW operation on a location in memory when the lock bit is set will cause the memory to return lock status information by means of a "busy" or "retry" confirmation a predetermined number of bus cycles after the second processor generated its interlock read command. The busy confirmation indicates to the processor that the second interlock read command was not accepted by the memory.

The interlock read operation alleviates problems caused by multiple processors each attempting to perform an RMW operation. Processors are granted equitable access to the bus for such interlock read operations by arbitration processes using, for example, a round-robin algorithm. However, performance bottlenecks can still occur. For example, under certain bus traffic conditions, a specific processor may repeatedly encounter locked memory locations and will be unable to obtain needed access to memory resources in a timely manner. Such problems could be reduced by providing multiple lock bits for a memory node with each lock bit associated with a portion of the memory node rather than with the whole memory node. Such multiple lock bits would provide finer "granularity" of interlocked read operations on a memory node, tying up a smaller portion of memory after an interlock read operation. This solution would also permit a higher success rate of RMW operations, thus improving system throughput. However, implementing multiple lock bits on prior art pended bus multiprocessor systems would result in unacceptably complex circuitry for detecting and transmitting lock status information.

Although the preceding discussion has emphasized the operation of a computer system employing processor nodes, memory nodes, and I/O nodes, a more general discussion of such a system is in the terms of commander nodes, that is, nodes which initiate a transaction on a bus, and responder nodes, that is, nodes which respond to a transaction initiated by a commander node. At various times, a single device can function as either a commander node or a responder node.

It is desirable to provide a computer system in which devices are interconnected over several busses, each having different characteristics. However, this was extremely difficult to accomplish in prior art pended bus systems using interlock read operations, in which lock status information was transmitted with a fixed time relationship to the initial interlocked read command.

SUMMARY OF THE INVENTION

It is therefore an object of the present invention to provide a multiprocessor system having multiple lock bits and simplified circuitry for transmitting lock status information.

It is a further object of the present invention to provide a multiprocessor pended bus computer system having interlock read operations in which lock status information is not transferred with a fixed time relationship to the initial interlock read command.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The present invention overcomes the problems and disadvantages of the prior art by providing an acknowledge confirmation a predetermined time after an interlock read command and a lock status message at an unspecified time after the interlock read message.

In accordance with the principles of the present invention, there is provided a system for implementing exclusive read-modify-write operations on a pended bus, the operations having a set of distinct transactions on the pended bus including an interlock read command to retrieve information stored at a specified location and restrict access to the stored information by subsequent interlock read commands, and an unlock write command to store information in the specified location and restore access to the stored information. The system comprises a bus and a plurality of first nodes coupled to the bus, each functioning as a commander node to initiate the interlock read and unlock write commands. The first nodes comprise means for receiving, at unspecified times subsequent to initiation of the interlock read commands, lock status messages indicating whether the interlock read commands were executed. The system further comprises a second node coupled to the bus functioning as a responder node. The second node comprises means for receiving the interlock read commands from the first nodes; storage means, including the specified location, for storing information; lock means, associated with the storage means and operable between an unlocked condition and a locked condition, for permitting access to the storage means when in an unlocked condition and for denying access to the storage means when in a locked condition; command means responsive to an interlock read command from one of the first nodes for supplying to the one of the first nodes information from the specified location if the lock means is in the unlocked condition and for switching the lock means from an unlocked condition to a locked condition; unlock write command means for storing modified information in the specified location and for switching the lock means from the locked condition to the unlocked condition; and status response means for transmitting to a first node which generated an interlock read command, at an unspecified time subsequent to initiation of the interlock read command, a lock status message corresponding to the lock means condition.

In another aspect, the invention provides a method for implementing exclusive read-modify-write operations on a system including a commander node and a responder node connected by a pended bus, the operations having a set of distinct transactions on the pended bus including an interlock read command to retrieve information stored at a specified location and restrict access to the stored information by subsequent interlock read commands, and an unlock write command to store information in the specified location and restore access to the stored information. The method comprises the steps of initiating an interlock read command from a commander node to a responder node; transmitting an acknowledge confirmation indicating receipt of the interlock read command from the responder node to the commander node at a predetermined time subsequent to initiation of a command; examining a lock indicator and, if the lock indicator is in an unlocked condition, switching the lock indicator from an unlocked condition to a locked condition; transmitting to the commander node, at an unspecified time subsequent to initiation of the interlock read command, a lock status message corresponding to the lock indicator condition; and storing modified information in the specified location and switching the lock indicator from the locked condition to the unlocked condition upon receipt of an unlock write command by the responder node.

The accompanying drawings, which are incorporated in and constitute a part of this specification, illustrate one embodiment of the invention, and, together with the description, serve to explain the principles of the present invention.

DETAILED DESCRIPTION OF THE PREFERRED EMBODIMENT

A. System Overview

Figure 1:
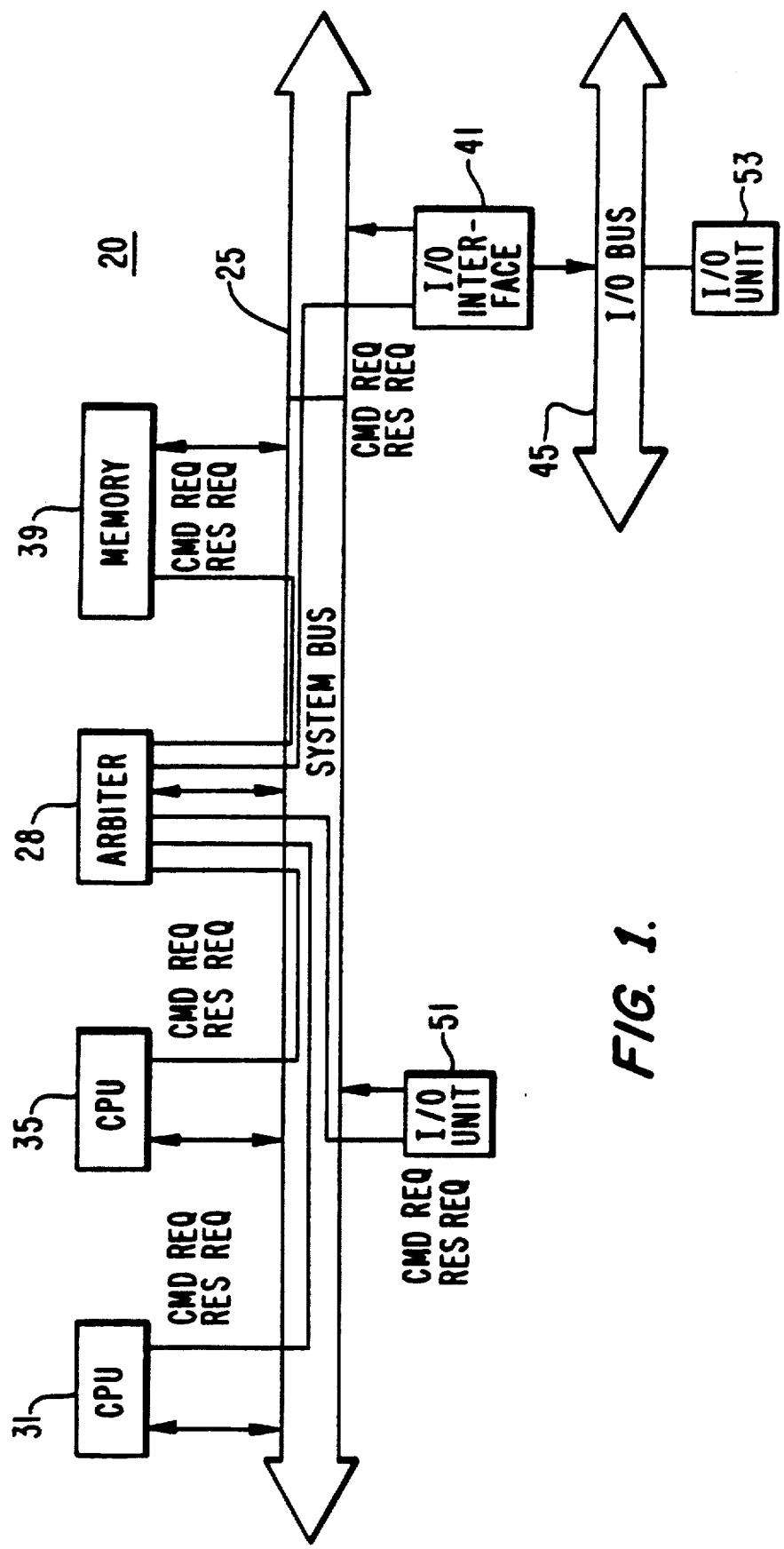
FIG. 1 is a block diagram of a data processing system using the present invention.

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/0 unit 51. I/0 unit 53, is coupled to system bus 25 by way of I/0 bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1 and as will be explained in greater detail in the description of FIG. 6, arbitration signals also include point-to-point conditional grant signals from central arbiter 28 to each node, system bus extend signals to implement multi-bus cycle transfers, and system bus suppression signals to control the initiation of new bus transactions when, for example, a node such as memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable PROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
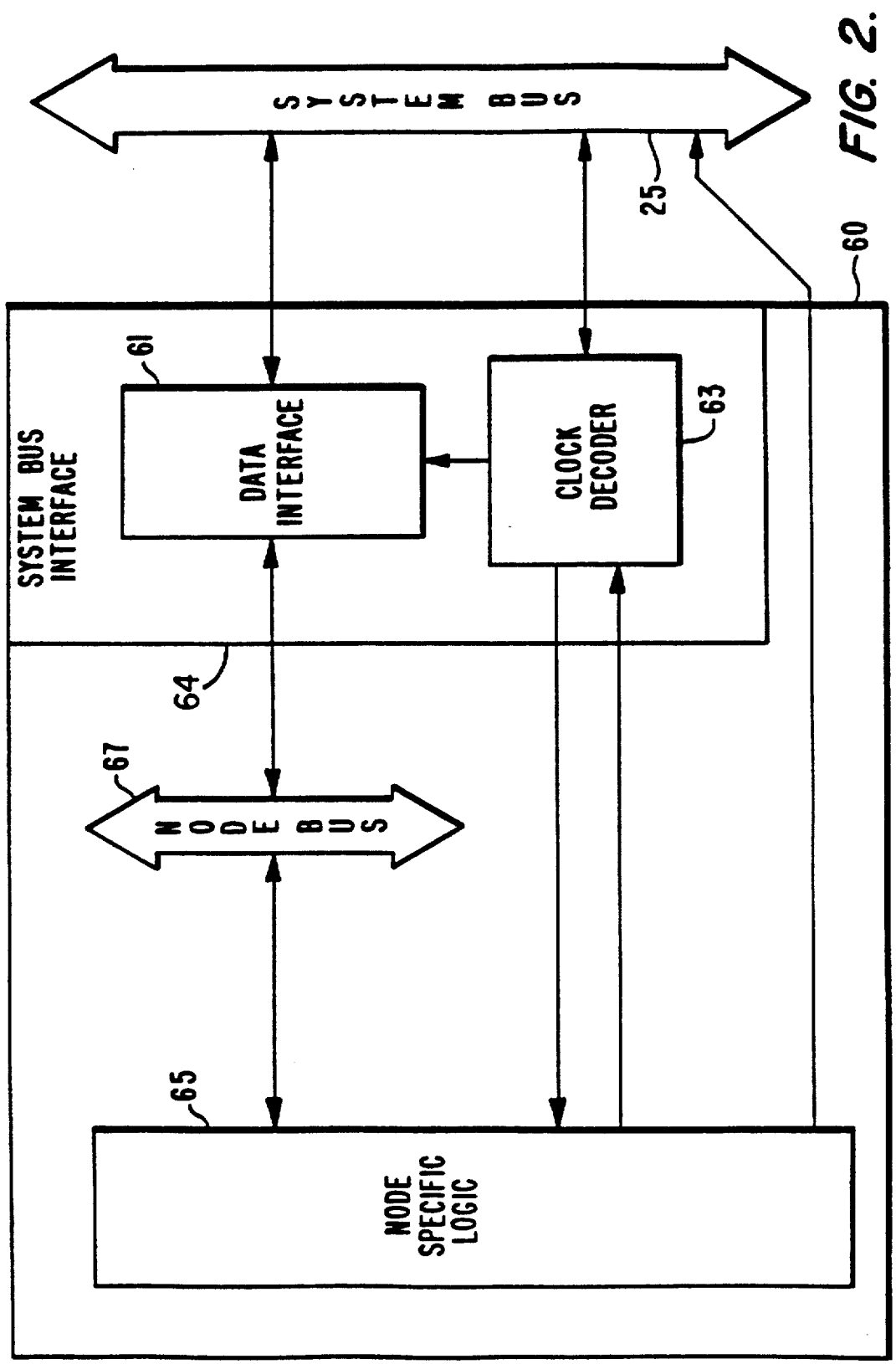
FIG. 2 is a block diagram of a node in the data processing system of FIG. 1.

FIG. 2 shows an example of a node 60 connected to system bus 25. Node 60 could be a processor, a memory, an I/O unit or an I/O interface, as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 from central arbiter 28 (FIG. 1) use the centrally generated clock signals, node 60 will operate synchronously with system bus 25.

Figure 3:
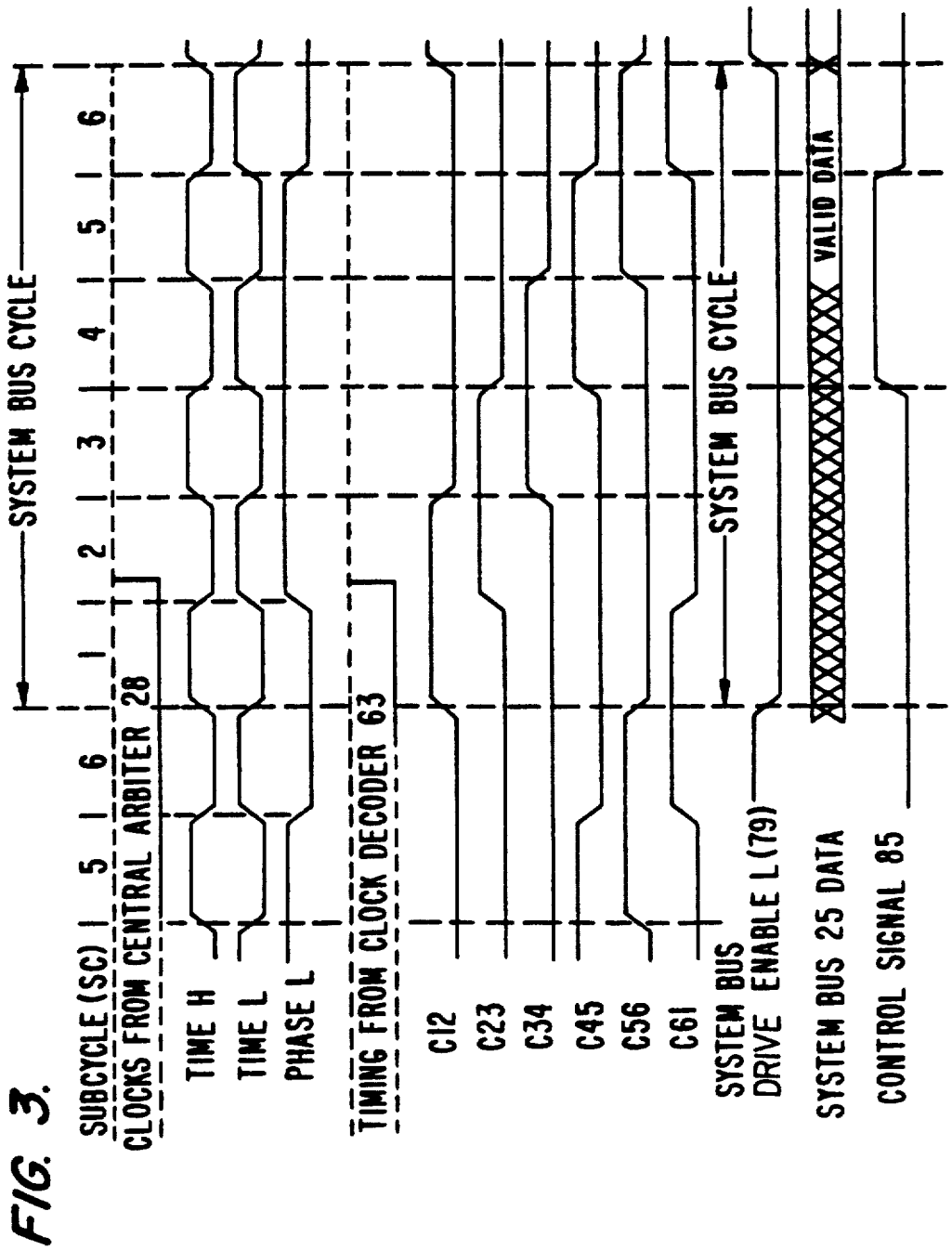
FIG. 3 is a timing diagram showing timing signals used in the data processing system of FIG. 1.

FIG. 3 is a timing diagram showing one bus cycle, the clock signals received by clock decoder 63, and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in Fig. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
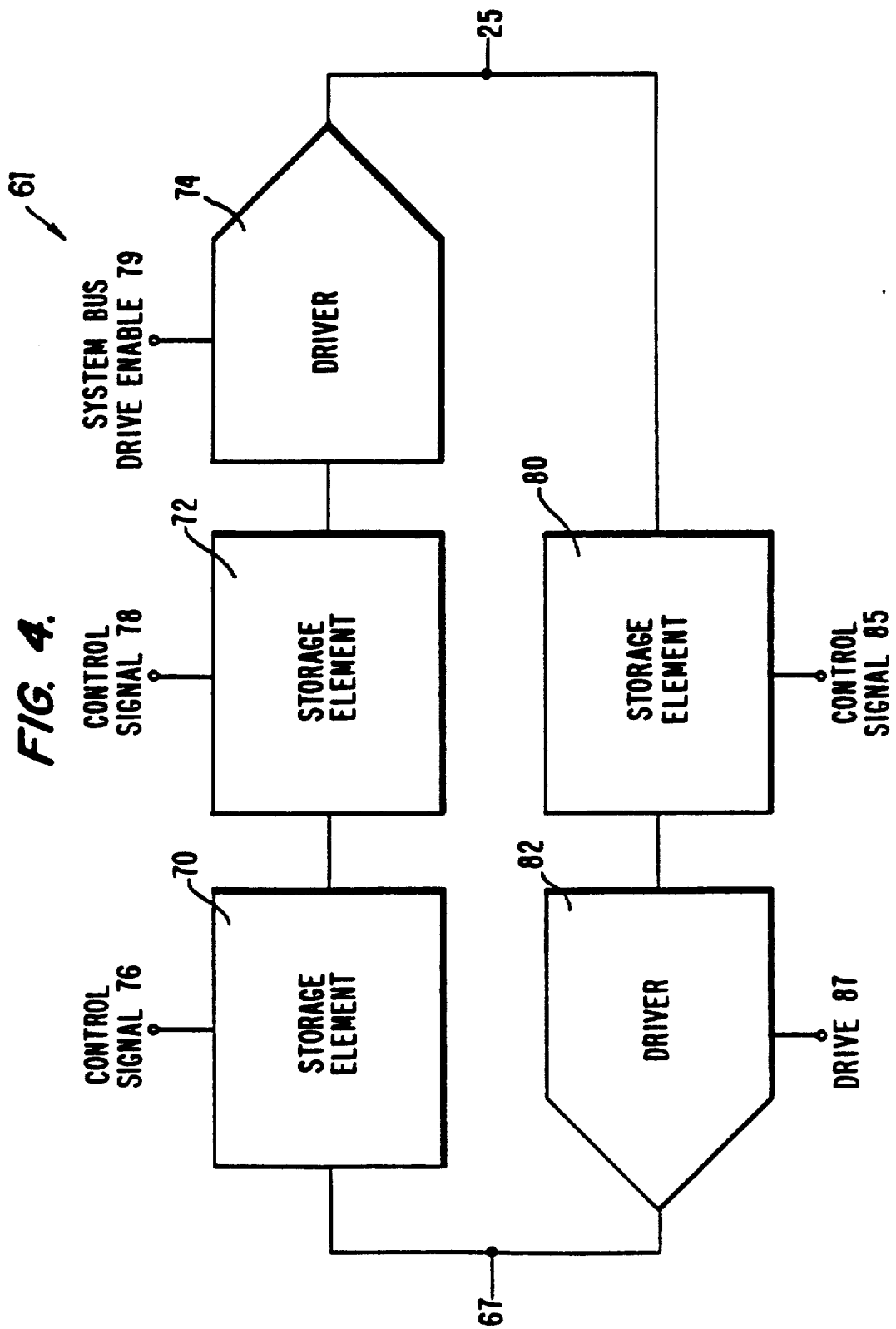
FIG. 4 is a block diagram of the data interface 61 in the node of FIG. 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Flip-flops 70 and 72 are controlled by node bus control signals 76 and 78, respectively, which are derived from the timing signals generated by clock decoder 63. Flip-flops 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus driver 82 similar to the manner in which system bus drive signal 79 controls system bus driver 74. Thus, in response to node bus drive signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to the end of a bus cycle. The new data become available for receipt from system bus 25 at some time later in the bus cycle after driver propagation and bus settling time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such point-to-point interconnection.

Figure 5:
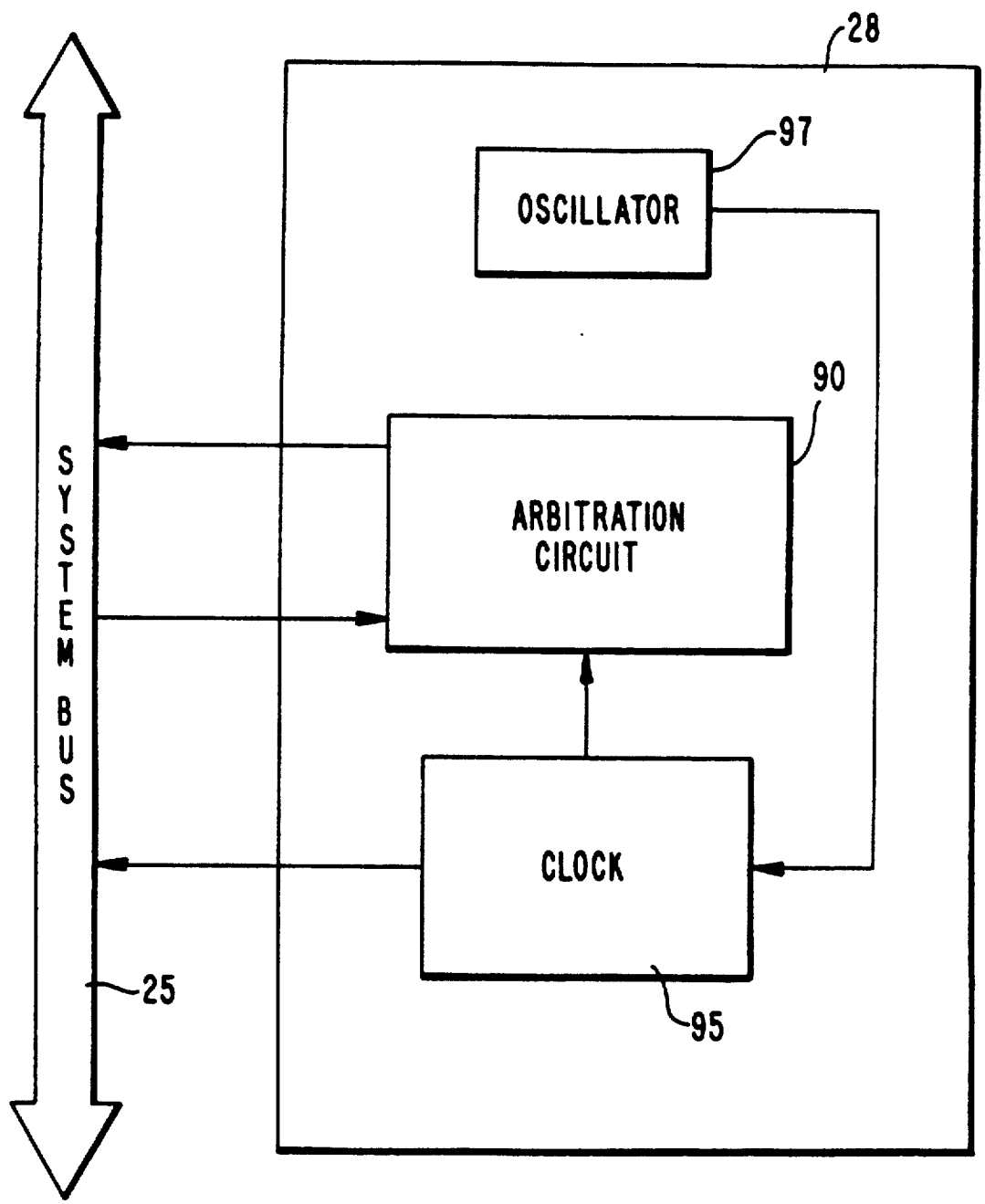
FIG. 5 is a block diagram of the arbiter in the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25 ownership of that bus. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. Discussion of Interlock Operations

As briefly discussed above, a number of different types of transactions are allowed on bus 25. In each case, the transaction is composed of one or more separate transfers from one node to another. When the responder node successfully receives a command transfer during one or more bus cycles, it generates an acknowledge confirmation at the beginning of the second bus cycle after each cycle of the transfer. Such acknowledgement signals do not indicate successful execution of the command contained in the original transfer, but merely indicate that the transfer was successfully placed in an input queue in the desired responder node. The transactions relevant to the present invention will be briefly described below.

A read transaction is used to move data in four-byte, eight-byte, sixteen-byte, or thirty two-byte blocks from a specific location in a responder node managing a region of address space to a commander node. In the preferred embodiment, memory and I/O operations are referenced to a common address space. A responder node can be either a memory node, a processor node, or an I/O node.

Interlock read transactions are similar to read transactions. However, the exact effect of an interlock read transaction depends on the state of lock tags in the responder node in a manner to be described later in greater detail. Lock tags prevent access to locations or groups of locations in address space. The effect of lock tags can be understood by visualizing address space of system 20 as appearing across a metallic "blackboard." Lock tags operate like magnetic tags removeably placed on top of locations or groups of locations on the address space "blackboard." If the location in address space specified in an interlock read transaction is already covered with a lock tag, that is, if the specified address space is "locked," the responder node responds to the interlock read request with a "locked" response message and no data is returned. This signifies to the commander that the location in address space specified in the interlock read command is not accessible. This locked response message is transmitted to the commander after the responder node services the interlock read command and after the responder node can gain access to bus 25. Thus, the commander receives the locked response message at an unspecified time after the command transfer of the interlock read transaction.

If the specified location is not locked, that is, not associated with a lock tag, information stored in the address specified in the interlock read command is returned in a response message to the commander node which generated the interlock read command. The responder node also attaches a lock tag to the location in address space specified in the interlock read command, thus denying access to the specified location in address space to subsequent interlock read commands.

The unlock write transaction is the complement to the interlock read transaction. When a commander node successfully completes the read and modify location in a read-modify-write operation, it must unlock the location in address space which it temporarily locked by an interlock read command. The commander accomplishes this operation by performing a unlock write transaction to the specified location in address space to write the appropriately modified data into the specified location. The responder node processes the unlock write command by unlocking the address space and writing the data as requested. The lock tag is then cleared in a manner to be described in greater detail.

Messages transmitted over bus 25 during an interlock read command transfer includes data on sixty four data lines. That data contains a four-bit command field, a two-bit length field which specifies the number of words to be transferred from e.g., memory 39 to processor node 31, and a thirty-bit address field which specifies the address location in memory 39 from which data is desired to be read. Other lines of system bus 25 carrying information during an interlock read command include four function lines carrying a four-bit function code indicating a command transfer, six ID lines carrying a six-bit code identifying the commander node which initiated the interlock read command, and three parity lines.

As briefly discussed above, system bus 25 includes respond signals which are used by a receiver to indicate successful reception of information placed on the bus by a transmitter. In the preferred embodiment, the respond signals include three identical wire-ORed confirmation (CNF) lines. Three lines are provided since it is extremely important to the integrity of bus transactions that a commander know exactly what a responder has done in response to each command, particularly in the case of an interlock command or a write to an I/O register. Therefore, a receiver will send either a acknowledge (ACK) confirmation by asserting all three CNF lines or a no acknowledge (NACK) confirmation by not asserting all three CNF lines. Error correction logic is provided in the receiver to determine the true CNF status if all three CNF lines are not received by the receiver at the same logic level.

An ACK confirmation indicates that a responder has accepted information from one cycle of command transfer or that a commander has accepted information from one cycle of a response message. A read command transfer cycle resulting in an ACK confirmation indication indicates that the responder will return a read response message at some later time.

A NACK confirmation returned on the CNF lines indicates that no receiver has accepted the information from that bus cycle of the command transfer. This could be for three reasons: (1) a parity error has occurred on the system bus 25, (2) the receiver was temporarily unable to accept the command, for example, when the receiver's input queue is full, or (3) there is no responder node corresponding to the specified address.

The confirmation indications corresponding to a bus cycle are placed on the CNF lines by the receiver node at the beginning of the second cycle after the bus cycle in which the transmitter node placed information on the bus.

An example of an interlock read transaction will be described in connection with FIG. 6. The horizontal axis at the top of FIG. 6 indicates successive bus cycles on bus 25. The labels appearing vertically along the left side of FIG. 6 indicate groups of lines contained in bus 25, that is, function lines, data lines, ID lines, confirmation lines, and arbitration lines. The entries in the matrix formed by the horizontal and vertical axes of FIG. 6 describe the type of data appearing on the specified bus lines during the specified bus cycles.

At bus cycle 0, a first commander node, for example, node 31 of FIG. 1, asserts its CMD REQ arbitration request line (one of the point to point lines connected to arbiter 28 and shown in FIG. 1) to arbiter 28. Figure 6 thus indicates a "cmdr #1" request present on arbitration lines of system bus 25 at cycle 1. Assuming that no other node of higher priority is simultaneously requesting access to the bus, processor 31 obtains bus access on cycle 1 and transmits a message into system bus 25.

During cycle 1 information placed on the function lines of bus 25 indicates that the information on the bus is command (cmd) information. The data placed on data lines of bus 25 consist of command and address (c/a) data identifying the current transaction as an interlock read transaction and specifying the address in memory 39 from which data is to be returned to processor 31. The ID lines during bus cycle 1 contain the identification code of processor (commander/cmdr) node 31 currently transmitting on bus 25.

During bus cycle 2, no information is placed on bus 25 in connection with the present interlock read transaction.

At the beginning of bus cycle 3, which is two cycles (i.e., a predetermined time) after initiation of the interlock read transaction, memory node 39 transmits an ACK confirmation on the confirmation lines of bus 25 if memory 39 successfully received the command transfer transmitted during bus cycle 1. Memory 39 then places the command message in the input queue of memory 39.

The end of bus cycle 3 constitutes the end of the first transfer in the interlock read transaction. Due to the pended nature of transactions on bus 25, the time when the requested information will be returned from memory 39 to processor 31 is not precisely defined. The response time depends on the length of time required by memory 39 to process the request and the amount of time necessary for system bus 25 to handle additional traffic on bus 25 generated by other nodes. The unspecified nature of the time between the two transfers of an interlock read transaction is indicated by the dotted line in FIG. 6 between bus cycles 3 and 4. Thus, although subsequent information is indicated by FIG. 6 to occur over bus cycles 4 through 7, it is to be understood that this is only a specific example of the timing involved in an interlock read transaction and that the second transfer of such transaction could occur in any subsequent cycle of bus 25.

Memory 39 processes the interlock read command by removing the interlock read transfer message from its input queue in turn and examining the address information contained in the transfer. The information is compared to address values stored in lock tags to be more completely described. If there is a match between the stored address values and the address information of the interlock read transfer, this is an indication that the desired address location has been locked by a previous interlock read command. Memory 39 then generates a locked response message including a "locked" function code along with other information required for a response message, in an output queue of memory node 39.

If the comparison of address values stored in lock tags with the interlock read transfer address information does not yield a "hit," that is, if the transferred address does not correspond to any stored address, memory node 39 constructs a response message consisting of a valid read response node such as "good read data" (grd0) code for functions lines, the contents of the specified address location for the data lines, and the commander identification code of the commander node which initiated the interlock read command for the ID lines. This response message is loaded into the output queue of memory node 39.

When memory 39 has processed the interlock read transaction and generated a response message within its output queue in a manner to be more completely described, memory 39 asserts its RES REQ request line (another point-to-point line shown in FIG. 1) to arbiter 28. The arbitration lines thus carry a responder request (resp) indication as shown in FIG. 6 at bus cycle 4. Assuming that no other nodes have higher priority at this time, arbiter 28 grants memory 39 access to bus 25 during bus cycle 5. Memory 39 transmits the response message including "good read data" (grd0) signal onto function lines of system bus 25, eight bytes (i.e. 64 bits) of data over the data lines of system bus 25 from the memory locations specified by the address field of the initial transfer from processor 31 to memory 39, and the ID of processor 31 onto the ID lines of bus 25 to associate the returning data with the commander (i.e. processor 31) which initially issued the interlock read request.

During bus cycle 6, no traffic appears on system bus 25 related to this interlock read transaction. Finally, the interlock read transaction concludes in bus cycle 7 when processor 31 transmits an ACK confirmation onto the confirmation lines of bus 25.

Figure 6:
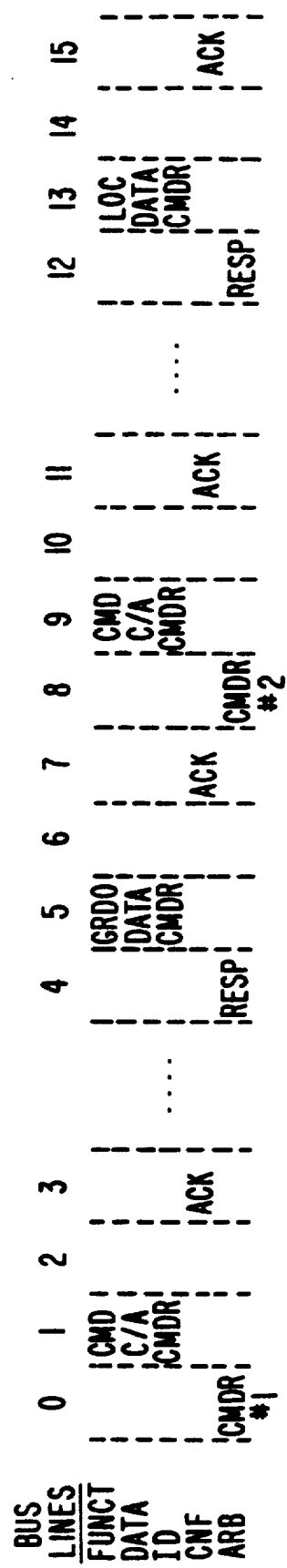
FIG. 6 is a timing diagram showing signals appearing on the system bus of FIG. 1 during an interlock read transaction.

A second interlock read transaction to the same specified location in memory will result in data appearing on bus 25 as shown in cycles 8-15 of FIG. 6. At cycle 8, a second commander (cmdr #2) initiates a commander request to arbitor 28. Bus cycles 9-12 result in traffic on bus 25 identical to cycles 1-4. However, memory 39, upon processing of the received interlock read command, found a match between the address values stored in lock tags and the address transmitted with the interlock read command. Accordingly, a LOC response is presented on function lines of bus 25 at, for example, cycle 13. Bus cycles 14 and 15 are identical to cycles 6 and 7.

C. Description of Processor 31

Figure 7:
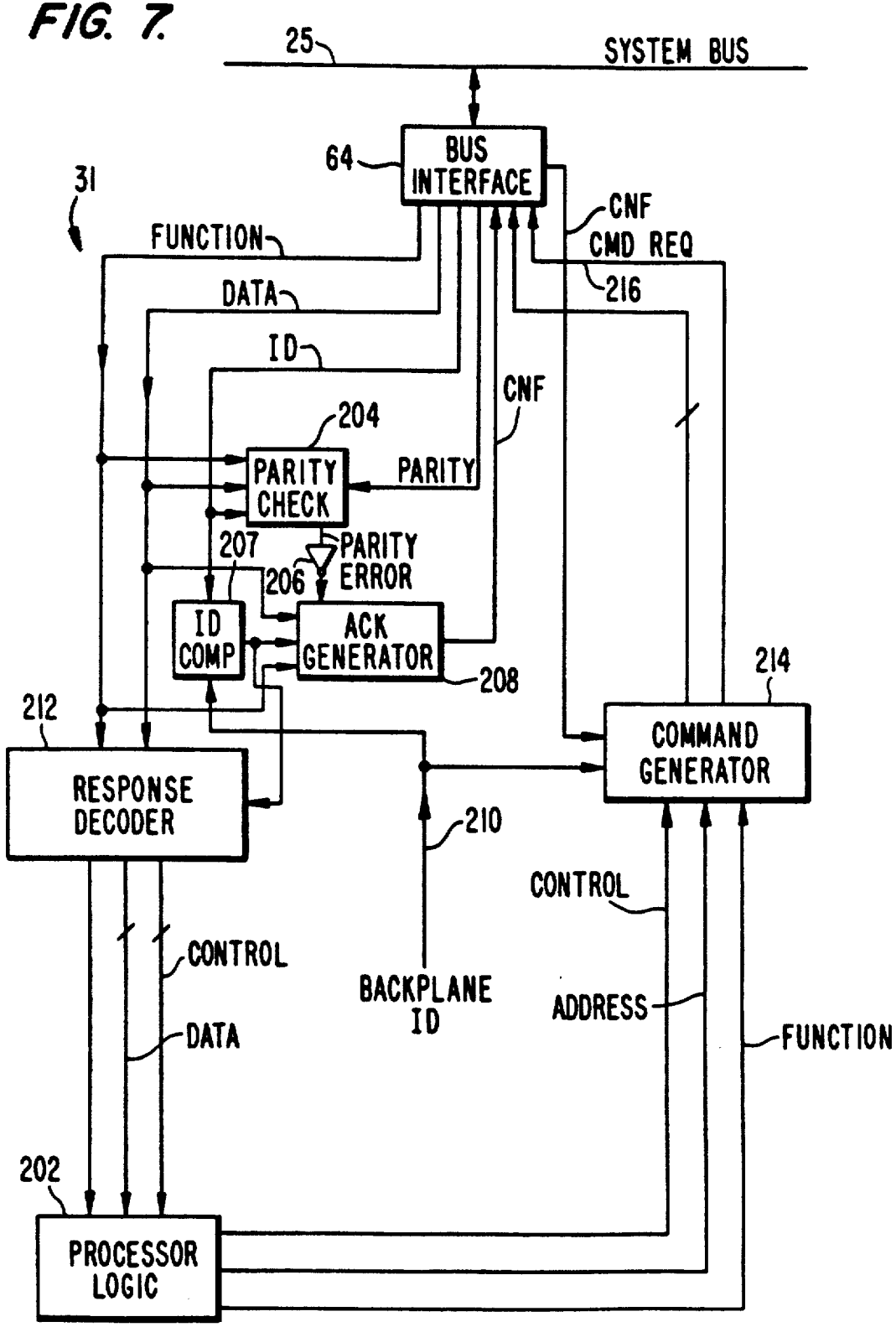
FIG. 7 is a block diagram of a processor node in the data processing system of FIG. 1.

Referring now to FIG. 7, there is shown a more detailed block diagram of certain elements of the node specific logic 65 in processor 31. Processor node 31 includes, as do all the nodes, bus interface circuit 64. Process node 31 also includes a processor logic 202. As shown in FIG. 7, processor logic 202 includes central processing unit (CPU) circuitry required to execute software in a manner well known to those skilled in the art. Processor logic 202 also generates command and address information as required by system 20 to execute the necessary application functions as well as to control transfers over system bus 25.

Processor node 31 also includes a parity error check circuit 204 which monitors information on the function, data, ID, and parity lines of system bus 25 received from bus interface circuit 64 to perform a parity check on those signals in a manner well known in the art. A detected parity error will result in the generation of a parity error indication on signal line 206.

The information on the ID lines is monitored by a comparator circuit 208 which is also supplied with the identification code of processor 31 from a hard-wired connection 210 on the backplane which is determined by the position of processor 31 in a mounting cabinet. The comparison result from comparator 207 is supplied, along with information on the parity error signal line 206, to an acknowledge confirmation generator 208. If no parity error was detected and if the ID code received over bus 25 for a response message matches the ID code of processor 31, ACK confirmations are transmitted over the CNF lines of bus 25 by an acknowledge confirmation generator 208 at the beginning of the second bus cycle after each cycle of a response transfer directed to processor 31.

Information on function and data lines of bus 25 is supplied through bus interface 64 to a response decoder 212. Decoder 212 is enabled by comparator 207 when a message over bus 25 is intended for processor 31. This is determined by a positive comparison result from comparator 207. If decoder 212 is enabled by comparator 207, decoder 212 extracts function codes from function lines of system bus 25, and for certain function codes, supplies command and data information from data lines of bus 25 to processor logic 202 for appropriate action.

In accordance with the present invention, there is provided means for transmitting command messages including interlock read and unlock write commands. As embodied herein, the transmitting means comprises a command generator 214. When processor 31 desires to initiate a transaction on bus 25, command, address, and data information is supplied to command generator 214, along with the ID of this node supplied from connection 210. Command generator 214 prepares a command transfer message and asserts the node CMD REQ arbitration line 216 to indicate to arbiter 28 (not shown in FIG. 7) that processor 31 desires access to bus 25 to transmit a commander message. Using an arbitration system, arbiter 28 grants bus access to processor 31 at an unspecified time after the original interlock read transfer.

Upon being granted access, command generator 214 causes bus interface 64 to transmit the command message from command generator 214 to system bus 25.

The responder node to which the interlock read command is directed will generate an acknowledge confirmation two cycles after the interlock read command transfer. As specifically shown in FIG. 7, command generator 212 monitors CNF lines to detect the presence of an ACK confirmation on the CNF bus lines two bus cycles after each cycle of a command transfer transmitted by a processor 31 over system bus 25. Failure to detect the presence of an ACK confirmation will result in appropriate corrective action which, in the preferred embodiment, consists of a retransmission of the previous command. When the transfer is complete, the responder node will process the interlock read command and return a response message on system bus 25. Because of uncertainties due to traffic on system bus 25 and queue lengths, the responder node will generate a response message at an unspecified time after the command transfer.

In accordance with the present invention, the commander node includes means for receiving, at predetermined times subsequent to initiation of the interlock read command, acknowledge indications indicating receipt of the interlock read commands initiated by the processor node and for receiving, at unspecified times subsequent to initiation of the interlock read command, lock status messages indicating whether the interlock read commands have been executed. As embodied in the system shown in FIG. 7, bus interface 64, processor logic 202, CNF lines connecting bus interface 64 and processor logic 202, and response decoder 212 constitute such means.

D. Description of Memory 39

Figure 8:
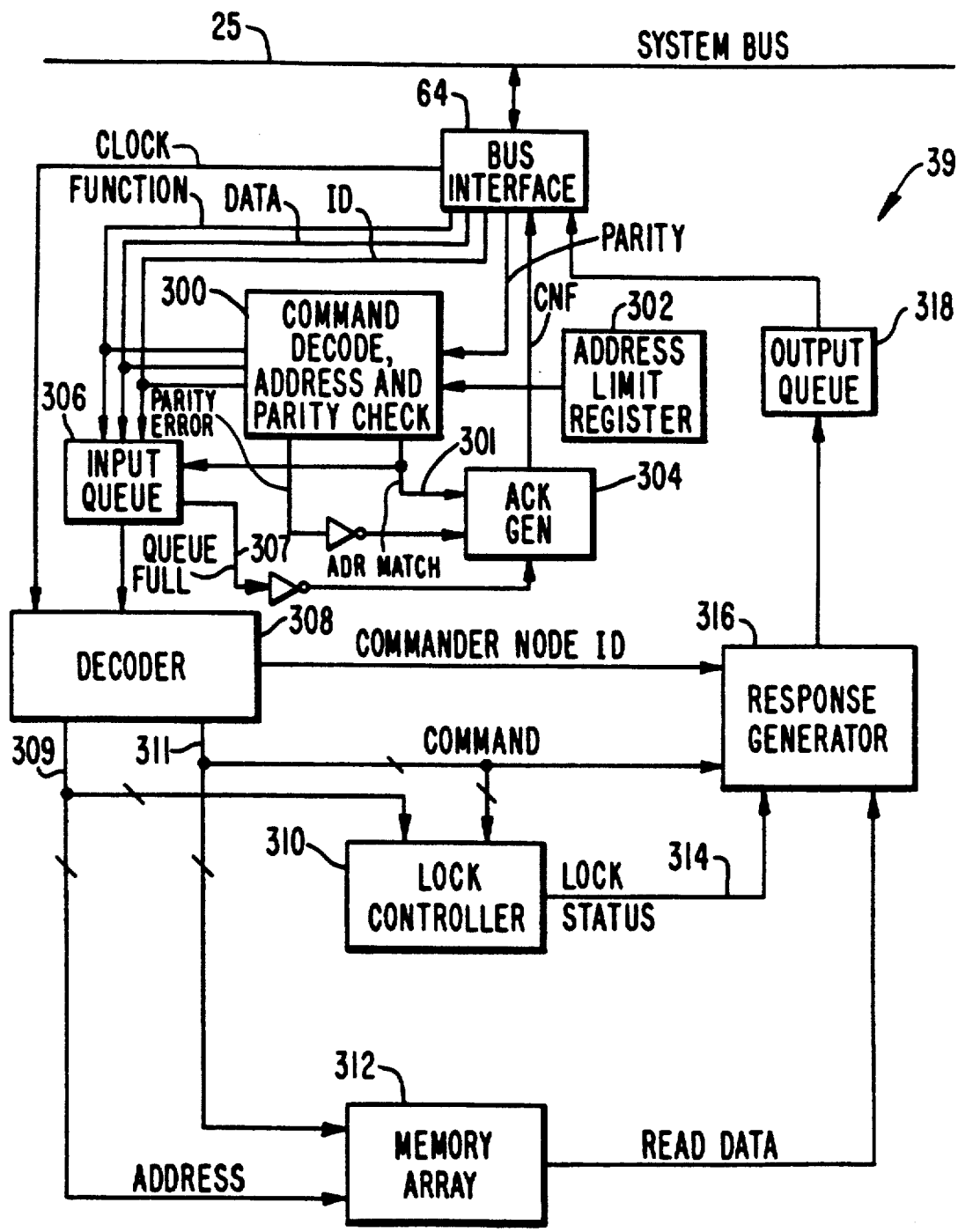
FIG. 8 is a block diagram of a memory node in the data processing system of FIG. 1.

FIG. 8 shows a block diagram of memory 39 which may function as a responder node. As can be seen in FIG. 8, memory 39 includes a command decode and address and parity check circuit 300. Circuit 300 is connected to the bus function, address, and ID lines and performs a parity check in a well-known manner. Circuit 300 also compares the information on bus address lines to the limits of address space served by memory 39, as supplied from a register 302, and supplies the results of this comparison on an address match line 301. If the address information received over bus 25 is within the range of address space served by memory 39 and if no parity error has occurred, an acknowledge generator 304, connected to circuit 300, will generate an ACK confirmation by asserting all three CNF lines at the beginning of the second cycle after the transmission cycle of a transfer destined for memory 39.

In accordance with the present invention, the memory includes means for receiving interlock read commands from the processor nodes. As embodied herein, such means includes an input queue 306 for storing messages (consisting of command, address, and data information) received from transfers over bus 25, via bus interface unit 64. Input queue 306 permits such messages, received at high speed over bus 25, to be stored until the relatively slower logic of memory 39 allows such messages to be acted upon. Input queue 306 is enabled to store a message from bus 25 when address information appearing in a message on bus 25 is within the limits of address space for memory 39, as determined by address match signal 301.

In accordance with the present invention, the responder node includes means for receiving interlock read commands from commander nodes and for transmitting acknowledge confirmations to the commander nodes at predetermined times subsequent to initiation of the interlock read commands. As shown in FIG. 8, bus interface 64, input queue 306, circuit 300, address register circuit 302, and acknowledge confirmation generator 304, and CNF lines internal to memory 39 constitute such means.

In accordance with the present invention, the memory comprises command decoder means for removing stored messages from the input queue and for generating interlock read and unlock write command and address data from the messages. As embodied herein, such means comprises a decoder 308. The output of input queue 306 is supplied to a decoder 308 which extracts address and command information from messages stored in input queue 306. Although decoder 308 supplies multiple indications to decode the various commands and provides address information on a set of parallel signal lines, the address and command outputs of decoder 306 are respectively shown in FIG. 8 as bundled lines 309 and 311 for purposes of clarity.

In accordance with the present invention, memory 39 includes storage means for storing information. As embodied herein, the storage means includes memory array 312. As is well known in the art, information is stored in a plurality of discrete locations in memory array 312 identified by addresses which may be specified by read and write commands supplied to the array 312.

In accordance with the present invention, the memory 39 includes lock means, associated with the storage means and operable between an unlocked condition and a locked condition, for permitting access to the storage means when in an unlocked condition and for denying access to the storage means when in a locked condition. As embodied herein, the lock means comprises a lock controller 310.

In accordance with the invention, the memory also includes command means responsive to an interlock read command from one of the processor nodes for generating a lock status indication indicating the condition of the lock means and for switching the lock means from an unlocked condition to a locked condition, and responsive to an unlock write command for storing modified information in the specified location and for switching the lock means from the locked condition to the unlocked condition. As embodied herein, the command means comprises lock controller 310 and memory array 312.

The address and command information is supplied to lock controller 310 which implements a locking scheme to be described later in greater detail. Address and command information from decoder 308 is also supplied to a memory array 312. Memory array 312 responds to read and write commands to read data from and write data to locations in array 312 specified by address information received from decoder 308.

In accordance with the invention, the memory 39 includes status response means for transmitting to a processor node which generated an interlock read command, at an unspecified time subsequent to initiation of the interlock read command, the lock status message including the lock status indication. Preferably, the response generator comprises response means for generating a first message type including contents of the specified location when the lock means is in the unlocked condition and a second message type indicating unavailability of the specified location when the lock means is in the locked condition. As embodied herein, the status response means comprises a response generator 316 and an output queue 318.

A lock status signal 314 from controller 310 and read data from memory array 312 are supplied to response generator 316 which generates an output response message to be described later in greater detail. Response messages from generator 316 are supplied to an output queue 318 for storage until memory 39 obtains access to the bus through the arbitration process described previously.

Response generator 316 prepares a response message based on data received from memory 312, lock status signal 314 received from controller 310, and command and ID information received from decoder 308. The response message prepared by generator 316 is either of two types, depending on whether memory 39 is permitted to supply the requested data. If the command being responded to is a non-interlock read command, or if the command is an interlock read command and lock status signal 314 is unasserted, response generator 316 prepares a first type of message including the requested contents of the specified location in memory 312. However, if the command is an interlock read command and the lock status line 314 is asserted, response generator 316 prepares the second type of message with a "locked" code on the function lines indicating that the specified address of the interlock read command was in a locked condition and that the requested data is not provided in the response message transmitted by memory 39 in response to the received interlock read command.

In accordance with the present invention, memory 39 includes output queue means for storing response messages from response generator 316 and for transmitting stored response messages to processor node 31 after obtaining access to bus 25 at unspecified times subsequent to initiation of a corresponding command by processor 31. As embodied herein, such means includes an output queue 318. When generator 316 has compiled the response message, it is supplied to output queue 318. Output queue 318 signals bus interface 64 that memory 39 desires access to bus 25. The response message is stored in output queue 318 for an unspecified time until such access is obtained.

When memory 39 is ranted access to bus 25, the response message contained in output queue 318 is placed on system bus 25 for transmission to the commander node which originally generated the command. Since it is not known at what time memory 39 will complete the execution of the command originally transmitted by the commander node and since it is further uncertain at what time memory 39 will obtain access to bus 25 to provide either the requested data or the lock status information, the lock status information corresponding to the interlock read command will appear on the function lines of bus 25 at the commander node at an unspecified time subsequent to initiation of the original interlock read command.

If a commander node fails receive the response message generated by the responder node after a successful interlock read command, the commander node will not generate an acknowledge indication. When the responder node fails to receive or acknowledge confirmation from its response message, it will clear the lock bit set by that interlock read command.

In accordance with the present invention, memory 39 includes means for generating a first message type including contents of a specified location when the lock means is in the unlocked condition and a second message type indicating unavailability of the specified location when the lock means is in the locked condition. As embodied herein, such means includes lock status line 314, response generator 316, decoder 308, and lock controller 310.

E. Description of Lock Controller 310

Figure 9:
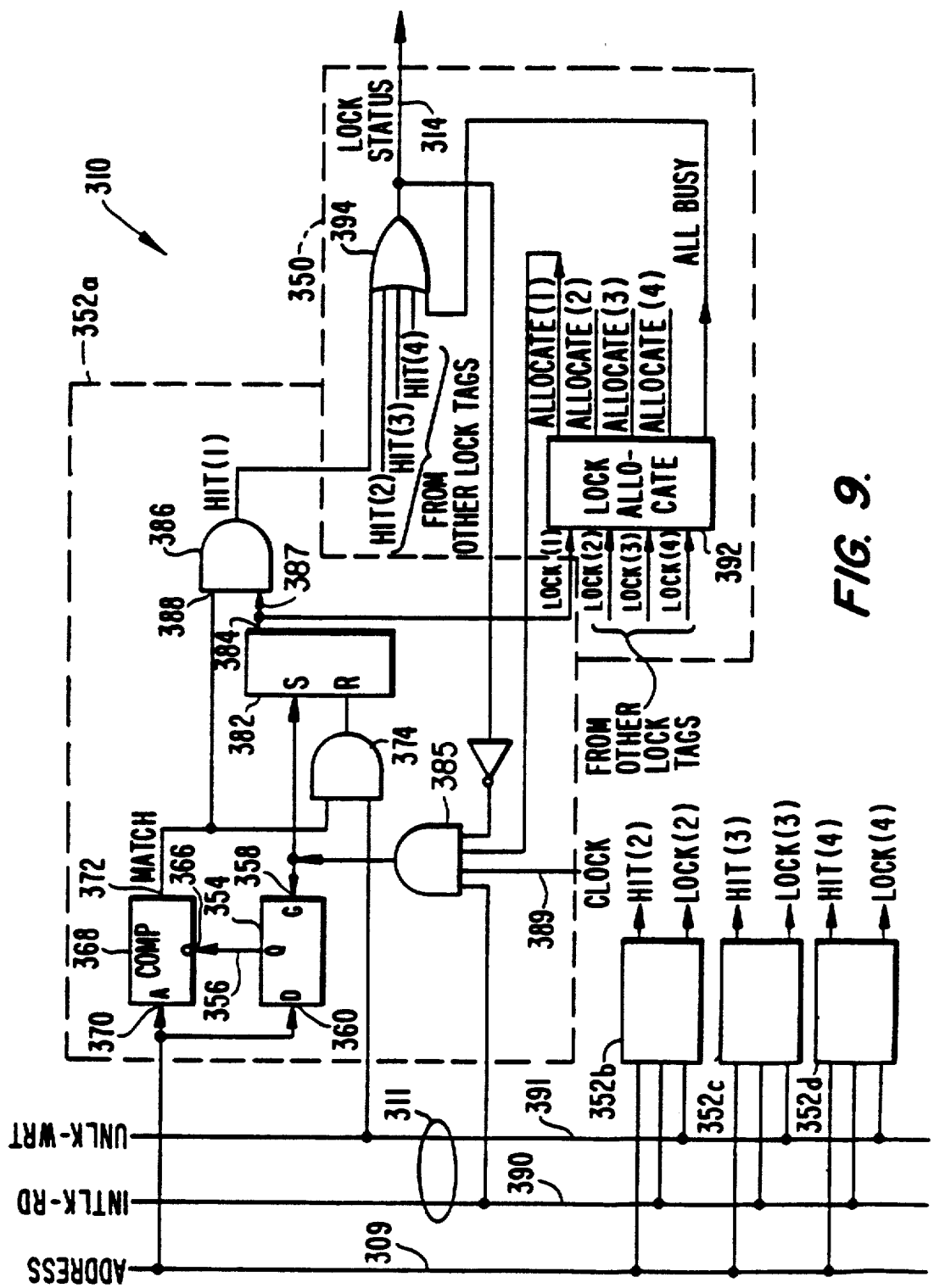
FIG. 9 is a block diagram of a lock controller in the memory node of FIG. 8.

Referring now to FIG. 9, there is shown a more detailed diagram of lock controller 310. In accordance with the invention the lock means includes lock tag means for receiving a selected address corresponding to an address in memory array 39 to which an interlock read command is to be prevented. As embodied herein, the lock tag means include four lock tags 352a, 352b, 352c, and 352d which, together with a logic controller 350, constitute lock controller 310. It is to be understood that more or fewer lock tags could be provided depending on the specific application. Lock tags 352a–d are identical in construction and operation. For purposes of clarity, detailed circuitry is shown only for lock tag 352a.

Each lock tag 352a–d includes a storage register 354 for storing a value corresponding to a location in address space of system 20. Register 354 includes an output terminal 356 at which appears the value stored in register 354. Register 354 includes an enable terminal 358 and an input terminal 360 connected to address line 309. Activation of enable terminal 358 causes register 354 to load the signals present on address lines 309.

Register output terminal 356 is connected to one input terminal 366 of a comparator 368. Comparator 368 has another input terminal 370 connected to address lines 309. An output terminal 372 of comparator 368 constitutes a "match" signal which is supplied to one input terminal of a two-input AND gate 374. The other input terminal of AND gate 374 is connected to unlock write line 380 of command lines 311. The output terminal of AND gate 374 is connected to the reset terminal of a latch 382. The output terminal 384 of latch 382 constitutes a LOCK signal which is supplied to one input terminal 387 of a two-input AND gate 386. The other input terminal 388 of AND gate 386 is connected to the match signal output of comparator 368. The output of AND gate 386 constitutes a "hit" signal indicating that an address appearing on address lines 309 is "locked" by lock tag 352a.

The final component of lock tag 352a is a four-input AND gate 385. One input of AND gate 385 is connected to a line 390 of command lines 311 indicating the command currently being processed by memory node 39 is an interlock read command. A second input of AND gate 385 is connected to a clock signal 389 to properly gate the operation of lock tag 352a and prevent race conditions. A third input of AND gate 385 is connected to an "allocate" terminal of logic controller 350 to be described below. The fourth input terminal of AND gate 385 is connected to an inverted lock status signal 314. The output terminal of AND gate 385 is connected to the enable input 358 of register 354 and the set terminal of latch 382.

Logic controller 350 includes a lock tag allocation circuit 392 which functions as a selection encoder to select an idle lock tag. Allocation circuit 392 determines, by the status of lock bits from lock tags 352a–d, which lock tags are free and assigns one of the available lock tags to provide the locking function by raising an "allocate" signal for the selected lock tag. If all lock tags are currently assigned, an "all busy" output signal is supplied to one input of a five-input OR gate 394. The other inputs of OR gate 394 are supplied by respective "hit" signals of lock tags 352a–d.

The operation of lock controller 310 to process an interlock read command will now be described. Address values on address lines 309 are constantly compared to stored address values in registers 354. If none of the address values stored in registers 354 is equal to the address values appearing on address lines 309, no match signal is asserted, and no "hit" signal is asserted. Assuming that the "all busy" signal of circuit 392 is also not asserted, no input of OR gate 394 is active and lock status line 314 is not set. Memory array 312 (FIG. 8) then supplies the contents of the specified location to response generator 316. The nonassertion of lock status line 314 causes response generator 316 to generate the first type of response message in which a "good read data" code is set in the bits of the response message which will eventually be transmitted over function lines of bus 25 to the commander node which requested them.

The inverted value of lock status line 314 is now supplied to AND gate 385. Circuit 392 is supplying one of the allocate signals of lock tags 352a–d. Since an interlock read is being processed, interlock read line 390 is set by decoder 308 (FIG. 8). Thus, when clock signal 389 is activated, AND gate 385 of lock tag 352a is activated to enable register 354. The address values appearing on address lines 309 are stored in register 354 of lock tag 352a. Activation of AND gate 385 also sets latch 382, thus asserting output 384 which constitutes a lock bit of lock tag 352a. Access to the specified location contained in register 354 of lock tag 352 is now denied to subsequent interlock read commands.

A subsequent interlock read command to the locked location will result in the following operation. Address values appearing on address lines 309 are equal to the value stored in register 354 of lock tag 352a. The match signal at terminal 372 of lock tag 352a is thus set. Since the lock bit at terminal 384 for lock tag 352a is set from the previous interlock read operation, both inputs of AND gate 386 are now active, causing the hit signal of lock tag 352a to be asserted. This in turn activates OR gate 394 to activate lock status line 314. Activation of lock status line 314 causes response generator 316 (FIG. 8) to generate a response message of a second type in which a LOCKED response code is set on function bits of the message.

The operation of a unlock write command to clear a lock bit will now be described. An unlock write command to a location previously locked will result in the values present on address lines 309 being equal to a value stored in a register 354 of a lock tag. For example, assume that an unlock write command has been transmitted to unlock a location locked by lock tag 352a. When the address value appears on address lines 309, the output of comparator 368 will cause a match signal to be set. Since the unlock write line 391 will also be high at this time, AND gate 374 will be activated, causing latch 382 to reset the lock bit signal at output terminal 384. AND gate 386 will be deactivated removing the active hit signal for lock tag 352a from the input terminal of OR gate 394. The data transmitted with the unlock write command is then written into the specified location in memory.

By providing a lock status message supplied to a processor as a data transfer over the system bus at an unspecified time after an interlock read command, the present invention allows the functions of transfer acknowledge and lock status transmission to be separated, thereby providing for the use of multiple lock bits without the expense and complexity which would be required if lock status information were required to be transmitted at a predetermined time or over dedicated lock status lines. This also permits lock status information to be obtained from nodes connected to the system through adapters and buses separate from the system bus.

Throughout the previous discussion, locked memory, or address space, was said to be specified by a "location.". It is to be understood that each address stored register may constitute a range of addresses, such that a single interlock read command or unlock write command can respectively lock and unlock a range of locations in address, and not merely a single location.

It will be apparent to those skilled in the art that various modifications and variations can be made in the bus interface circuitry and interface of this invention without departing from the spirit or scope of the present invention. The present invention covers such modifications and variations which are within the scope of the appended claims and their equivalents.

What is claimed is:

1. A system for implementing exclusive read-modify-write operations, said operations having a set of distinct transactions including an interlock read transaction to retrieve information stored at a specified location and restrict access to said stored information by subsequent interlock read transactions, and an unlock write transaction to store information in said specified location and restore access to said stored information, said interlock read transaction including a command transfer comprising an interlock read command arbitration, an interlock read command message including an interlock read command, and an interlock read command confirmation; said interlock read transaction further including a response transfer, said response transfer comprising a response arbitration, a response message, and a response confirmation; said unlock write transaction including a command transfer comprising an unlock write command arbitration, an unlock write command message, and an unlock write command confirmation; said system comprising:

a synchronous pended bus;
a plurality of first nodes coupled to said synchronous pended bus, each functioning as a commander node to initiate said interlock read and unlock write command messages, at least one of said first nodes comprising means for receiving, at a predetermined time subsequent to initiation of said interlock read command message by said one first node during bus cycles reserved by said interlock read command arbitration, said interlock read command confirmation indicating receipt of said interlock read command message initiated by said one first node and for receiving, at an unspecified time subsequent to initiation of said interlock read command message during bus cycles reserved by said response arbitration, a lock response message indicating whether said interlock read command was executed; and
a second node coupled to said synchronous pended bus, functioning as a responder node, said second node comprising: means for receiving said interlock read command message from said one first node;
storage means, including said specified location, for storing information;
lock means, associated with said storage means and operable between an unlocked condition and a locked condition, for permitting access to said storage means when in an unlocked condition and for denying access to said storage means when in a locked condition;
acknowledge means for acknowledging receipt of said interlock read command message by transmitting to said one first node, at a predetermined time subsequent to transmission of said interlock read command message during bus cycles reserved by said interlock read command arbitration, said interlock read command confirmation indicating successful receipt of said interlock read command message;
command means responsive to an interlock read command message from said one of said first nodes for generating a lock status indication indicating the condition of said lock means and for switching said lock means from an unlocked condition to a locked condition, and responsive to an unlock write command message for storing modified information in said specified location and for switching said lock means from the locked condition to the unlocked condition; and
status response means for transmitting to said one first node, at an unspecified time subsequent to initiation of said interlock read command message during bus cycles reserved by said response arbitration, said lock response message including said lock status indication.

2. A system as recited in claim 1 wherein said status response means comprises means for generating a first response message type including contents of said specified location when said lock means is in said unlocked condition and a second response message type indicating unavailability of said specified location when said lock means is in said locked condition.

3. A system as recited in claim 1 wherein said storage means comprises a memory array.

4. A system as recited in claim 3 wherein said lock means comprises lock tag means for receiving a selected address corresponding to an address in said memory array to which an interlock read command is to be prevented.

5. A system as recited in claim 4 wherein said lock means comprises a plurality of said lock tag means each for receiving a selected address, whereby interlock read commands can be separately prevented to a plurality of address locations in said memory array.

6. A system as recited in claim 4 wherein said lock tag means receives a selected address corresponding to a plurality of address locations in said memory array.

7. A system for implementing exclusive read-modify-write operations propagating data during repetitive bus cycles, said operations having a set of distinct transactions including an interlock read transaction to retrieve information stored at a specified location in a memory node and place said specified location in a locked condition to restrict access to said stored information by subsequent interlock read transactions, and an unlock write transaction to store information in said specified location and place said specified location in an unlocked condition to restore access to said stored information, said interlock read transaction including a command transfer comprising an interlock read command arbitration, an interlock read command message including an interlock read command, and an interlock read command confirmation; said interlock read transaction further including a response transfer, said response transfer comprising a response arbitration, a response message, and a response confirmation; said unlock write transaction including a command transfer comprising an unlock write command arbitration, an unlock write command message, and an unlock write command confirmation; said system comprising:

a synchronous pended bus;

a plurality of processor nodes coupled to said synchronous pended bus, each capable of initiating said interlock read transaction, said processor nodes comprising means for transmitting command messages including said interlock read and unlock write command messages, and means for receiving said interlock read command confirmations a predetermined number of bus cycles subsequent to initiation of said interlock read command messages during bus cycles reserved by said command arbitrations, said interlock read command confirmations indicating receipt of said interlock read command messages initiated by said processor nodes, and for receiving said response messages at unspecified times subsequent to command messages during bus cycles reserved by said response arbitrations, said response messages including said information when said specified location is in an unlocked condition and including a locked response when said specified location is in a locked condition;

a memory node coupled to said synchronous pended bus comprising:

acknowledge means for transmitting said interlock read command confirmations to said processor nodes after said predetermined number of bus cycles subsequent to initiation of said received interlock read command messages;

input queue means for receiving and storing said interlock read and unlock write command messages from said processor nodes;

command decoder means for removing commands from said interlock read and unlock write command messages stored in said input queue means and for generating interlock read and unlock write control and address information from said commands;

a memory array having a plurality of address locations each having a corresponding address value, said memory array including said specified location and responsive to control and address information from said decoder means for storing and retrieving said stored information;

a lock storage register for storing a memory address value corresponding to address locations in said memory array;

lock controller means responsive to said interlock read control and address information from said decoder means for placing said interlock read address data in said lock storage register if said interlock read address does not already appear in said lock storage register, and for placing in a locked condition a memory array address location corresponding to said address data stored in said lock storage register, said lock controller means responsive to unlock write command and address data from said decoder means for placing in an unlocked condition a memory array address location corresponding to a said unlock write data stored in said lock storage register, said lock controller means responsive to said interlock read command data to generate a lock status signal corresponding to the condition of a memory array address location specified by said interlock read address data;

generator means responsive to said lock status signal for generating a response message including the contents of a memory address specified by address data of a command removed from said input queue if said specified address is in an unlocked condition and for generating a response message including a locked response if said specified address is in a locked condition; and output queue means for storing response messages from said generator means and for transmitting said stored response messages to said processor nodes after obtaining access to said synchronous pended bus during bus cycles reserved by said response arbitrations at unspecified times subsequent to initiation of a corresponding interlock read command by said processor nodes.

8. A system as recited in claim 7, wherein said lock controller means restores said memory array address location to an unlocked condition if said response message is not successfully received by said processor node.

9. A method for implementing exclusive read-modify-write operations on a multiple-node computer system including a plurality of commander nodes and a responder node connected by a synchronous pended bus, said operations having a set of distinct transactions on said synchronous pended bus including an interlock read transaction to retrieve information stored at a specified location and restrict access to said stored information by subsequent interlock read transactions, and an unlock write transaction to store information in said specified location and restore access to said stored information, said interlock read transaction including a command transfer comprising an interlock read command arbitration to reserve bus cycles on said synchronous pended bus, an interlock read command message transmitted by one of said commander nodes over said synchronous pended bus during said bus cycles reserved by said interlock read command arbitration, and an interlock read command confirmation transmitted over said synchronous pended bus to said one commander node during bus cycles reserved by said interlock read command arbitration; said interlock read transaction further including a response transfer, said response transfer comprising a response arbitration to reserve bus cycles on said synchronous pended bus, a response message transmitted to said one commander node over said synchronous pended bus during said bus cycles reserved by said response arbitration, and a response confirmation transmitted over said synchronous pended bus from said one commander node during bus cycles reserved by said response arbitration; said unlock write transaction including a command transfer comprising an unlock write command arbitration to reserve bus cycles on said synchronous pended bus, an unlock write command message transmitted to said one commander node during bus cycles reserved by said unlock write command arbitration, and an unlock write command confirmation transmitted over said synchronous pended bus during bus cycles reserved by said unlock write command arbitration; said method comprising the steps of:

initiating an interlock read command message from one of said commander nodes to said responder node;

transmitting an interlock read command confirmation indicating receipt of said interlock read command message from said responder node to said one commander node at a predetermined time subsequent to initiation of said interlock read command message during bus cycles reserved by said interlock read command arbitration;

examining a lock indicator having one of a locked and an unlocked condition, and, if said lock indicator is in an unlocked condition, switching said lock indicator from an unlocked condition to a locked condition;

transmitting to said one commander node, at an unspecified time subsequent to initiation of said interlock read command message during bus cycles reserved by said response arbitration, a response message representing a lock status signal corresponding to said lock indicator condition; and storing modified information in said specified location and switching said lock indicator from the locked condition to the unlocked condition upon receipt of an unlock write command message by said responder node.

10. A method for implementing exclusive read-modify-write operations on a synchronous pended bus propagating data during repetitive bus cycles, said operations having a set of distinct transactions on said pended bus including an interlock read transaction to retrieve information stored at a specified location in memory node and place said specified location in a locked condition to restrict access to said stored information by subsequent interlock read transactions, and an unlock write transaction to store information in said specified location and place said specified location in an unlocked condition to restore access to said stored information, said interlock read transaction including a command transfer comprising an interlock read command arbitration to reserve bus cycles on said synchronous pended bus, an interlock read command message transmitted by one of said commander nodes over said synchronous pended bus during said bus cycles reserved by said interlock read command arbitration, and an interlock read command confirmation transmitted over said synchronous pended bus to said one commander node during bus cycles reserved by said interlock read command arbitration; said interlock read transaction further including a response transfer, said response transfer comprising a response arbitration to reserve bus cycles on said synchronous pended bus, a response message transmitted to said one commander node over said synchronous pended bus during said bus cycles reserved by said response arbitration, and a response confirmation transmitted over said synchronous pended bus from said one commander node during bus cycles reserved by said response arbitration; said unlock write transaction including a command transfer comprising an unlock write command arbitration to reserve bus cycles on said synchronous pended bus, an unlock write command message transmitted to said one commander node during bus cycles reserved by said unlock write command arbitration, and an unlock write command confirmation transmitted over said synchronous pended bus during bus cycles reserved by said unlock write command arbitration; said method comprising the steps of:

initiating an interlock read command message, including an address specifying said location, from one of said commander nodes to said responder node;

transmitting an interlock read command confirmation indicating receipt of said interlock read command message from said responder node to said one commander node a predetermined number of cycles subsequent to initiation of said interlock read command message during bus cycles reserved by said command arbitration;

receiving said interlock read and unlock write command messages from said one processor node;

storing said received command messages in an input queue;

removing said stored messages from said input queue;

generating interlock read and unlock write control and address information from said stored command messages;

responding to said interlock read control information by placing said interlock read address information in a lock storage register, setting a lock bit, and storing the contents of a memory array location corresponding to said interlock read address information in a first type of response message in an output queue if said interlock read address information was not was previously stored in said lock storage register;

responding to said interlock read control information by placing a locked code in a second type of response message in said output queue if said interlock read address information was previously stored in said lock storage register;

responding to unlock write control information by writing data in said memory array and, if said unlock write address information was previously stored in said lock storage register, resetting said lock bit; and transmitting to said one commander node, at an unspecified time subsequent to initiation of said interlock read command message during bus cycles reserved by said response arbitration, said response message stored in said output queue.

11. A system for implementing exclusive read-modify-write operations, said operations having a set of distinct transactions including an interlock read transaction to retrieve information stored at a specified location and restrict access to said stored information by subsequent interlock read transactions, and an unlock write transaction to store information in said specified location and restore access to said stored information; said interlock read transaction including a command transfer comprising an interlock read command arbitration to reserve bus cycles, an interlock read command message including an interlock read command, and an interlock read command confirmation; said interlock read transaction further including a response transfer, said response transfer comprising a response arbitration to reserve bus cycles, a response message, and a response confirmation; said unlock write transaction including a command transfer comprising an unlock write command arbitration, an unlock write command message, and an unlock write command confirmation; said system comprising:

a synchronous pended bus;

a plurality of first nodes coupled to said synchronous pended bus, each functioning as a commander node to initiate said interlock read and unlock write command messages, at least one of said first nodes comprising means for receiving, during a bus cycle reserved by said interlock read command arbitration, said interlock read command confirmation indicating receipt of said interlock read command message initiated by said one first node, and for receiving, during a bus cycle reserved by said response arbitration, a lock response message indicating whether said interlock read command was executed; and a second node coupled to said synchronous pended bus, functioning as a responder node, said second node comprising:

means for receiving said interlock read command message from said one first node;

storage means, including said specified location, for storing information;

lock means, associated with said storage means and operable between an unlocked condition and a locked condition, for permitting access to said storage means when in an unlocked condition and for denying access to said storage means when in a locked condition;

acknowledge means for acknowledging receipt of said interlock read command message by transmitting to said one first node, during a bus cycle reserved by said interlock read command arbitration, said interlock read command confirmation indicating successful receipt of said interlock read command message;

command means responsive to an interlock read command message from said one of said first nodes for generating a lock status indication indicating the condition of said lock means and for switching said lock means from an unlocked condition to a locked condition, and responsive to an unlock write command message for storing modified information in said specified location and for switching said lock means from the locked condition to the unlocked condition; and status response means for transmitting to said one first node, during a bus cycle reserved by said response arbitration, said lock response message including said lock status indication.

12. A system for implementing exclusive read-modify-write operations propagating data during repetitive bus cycles, said operations having a set of distinct transactions including an interlock read transaction to retrieve information stored at a specified location in a memory node and place said specified location in a locked condition to restrict access to said stored information by subsequent interlock read transactions, and an unlock write transaction to store information in said specified location and place said specified location in an unlocked condition to restore access to said stored information; said interlock read transaction including a command transfer comprising an interlock read command arbitration to reserve bus cycles, an interlock read command message including an interlock read command, and an interlock read command confirmation; said interlock read transaction further including a response transfer, said response transfer comprising a response arbitration to reserve bus cycles, a response message, and a response confirmation; said unlock write transaction including a command transfer comprising an unlock write command arbitration to reserve bus cycles, an unlock write command message, and an unlock write command confirmation; said system comprising:

a synchronous pended bus;

a plurality of processor nodes coupled to said synchronous pended bus, each capable of initiating said interlock read transaction, each of said processor nodes comprising means for transmitting command messages including said interlock read and unlock write command messages, means for receiving said interlock read command confirmations during a bus cycle reserved by said interlock read command arbitrations, said interlock read command confirmations indicating receipt of said interlock read command messages initiated by said processor nodes, and means for receiving said response messages during a bus cycle reserved by said response arbitrations, said response messages including said information when said specified location is in an unlocked condition and including a locked response when said specified location is in a locked condition;

a memory node coupled to said synchronous pended bus, comprising:

acknowledge means for transmitting said interlock read command confirmations to said processor nodes during a bus cycle reserved by said interlock read command arbitration;

input queue means for receiving and storing said interlock read and unlock write command messages from said processor nodes;

command decoder means for removing commands from said interlock read and unlock write command messages stored in said input queue means and for generating interlock read and unlock write control and address data from said commands;

a memory array having a plurality of address locations each having a corresponding address value, said memory array including said specified location and responsive to control and address data from said decoder means for storing and retrieving said stored information;

a lock storage register for storing a memory address value corresponding to an address location in said memory array;

lock controller means responsive to said interlock read control and address data from said decoder means for placing said interlock read address data in said lock storage register if said interlock read address data does not already appear in said lock storage register, and for placing in a locked condition a memory array address location corresponding to said address data stored in said lock storage register, said lock controller means responsive to unlock write command address data from said decoder means for placing in an unlocked condition a memory array address location corresponding to a said unlock write data stored in said lock storage register, said lock controller means responsive to said interlock read command data to generate a lock status signal corresponding to the condition of a memory array address location specified by said interlock read address data;

generator means responsive to said lock status signal for generating a response message including the contents of a memory address location specified by address data of a command removed from said input queue if said specified address location is in an unlocked condition and for generating a response message including a locked response if said specified address location is in a locked condition; and output queue means for storing response messages from said generator means and for transmitting said stored response messages to said processor nodes after obtaining access to said synchronous pended bus during a bus cycle reserved by said response arbitrations.

13. A method for implementing exclusive read-modify-write operations on a multiple-node computer system including a plurality of commander nodes and a responder node connected by a synchronous pended bus, said operations having a set of distinct transactions on said synchronous pended bus including an interlock read transaction to retrieve information stored at a specified location and restrict access to said stored information by subsequent interlock read transactions, and an unlock write transaction to store information in said specified location and restore access to said stored information; said interlock read transaction including a command transfer comprising an interlock read command arbitration to reserve bus cycles on said synchronous pended bus, an interlock read command message transmitted by one of said commander nodes over said synchronous pended bus during a bus cycle reserved by said interlock read command arbitration, and an interlock read command confirmation transmitted over said synchronous pended bus to said one commander node during a bus cycle reserved by said interlock read command arbitration; said interlock read transaction further including a response transfer, said response transfer comprising a response arbitration to reserve bus cycles on said synchronous pended bus, a response message transmitted to said one commander node over said synchronous pended bus during a bus cycle reserved by said response arbitration, and a response confirmation transmitted over said synchronous pended bus from said one commander node during a bus cycle reserved by said response arbitration; said unlock write transaction including a command transfer comprising an unlock write command arbitration to reserve bus cycles on said synchronous pended bus, an unlock write command message transmitted to said one commander node during a bus cycle reserved by said unlock write command arbitration, and an unlock write command confirmation transmitted over said synchronous pended bus during a bus cycle reserved by said unlock write command arbitration; said method comprising the steps of:
  transmitting an interlock read command message from one of said commander nodes to said responder node;
  transmitting an interlock read command confirmation indicating receipt of said interlock read command message from said responder node to said one commander node during a bus cycle reserved by said interlock read command arbitration;
  examinating a lock indicator having one of a locked and an unlocked condition, and, at times when said lock indicator is in an unlocked condition, switching said lock indicator from an unlocked condition to a locked condition;
  transmitting to said one commander node, during the bus cycle reserved by said response arbitration, a response message representing a lock status signal corresponding to said lock indicator condition; and
  storing modified information in said specified location and switching said lock indicator from the locked condition to the unlocked condition upon receipt of an unlock write command message by said responder node.

14. A method for implementing exclusive read-modify-write operations on system including a plurality of commander nodes, a responder node, and a synchronous pended bus propagating data during repetitive bus cycles, said operations having a set of distinct transactions on said pended bus including an interlock read transaction to retrieve information stored at a specified location in said responder node and place said specified location in a locked condition to restrict access to said stored information by subsequent interlock read transactions, and an unlock write transaction to store information in said specified location and place said specified location in an unlocked condition to restore access to said stored information; said interlock read transaction including a command transfer comprising an interlock read command arbitration to reserve bus cycles on said synchronous pended bus, an interlock read command message transmitted by one of said commander nodes over said synchronous pended bus during a bus cycle reserved by said interlock read command arbitration, and an interlock read command confirmation transmitted over said synchronous pended bus to said one commander node during a bus cycle reserved by said interlock read command arbitration; said interlock read transaction further including a response transfer, said response transfer comprising a response arbitration to reserve bus cycles on said synchronous pended bus, a response message transmitted to said one commander node over said synchronous pended bus during a bus cycle reserved by said response arbitration, and a response confirmation transmitted over said synchronous pended bus from said one commander node during a bus cycle reserved by said response arbitration; said unlock write transaction including a command transfer comprising an unlock write command arbitration to reserve bus cycles on said synchronous pended bus, an unlock write command message transmitted to said one commander node during a bus cycle reserved by said unlock write command arbitration, and an unlock write command confirmation transmitted over said synchronous pended bus during a bus cycle reserved by said unlock write command arbitration; said method comprising the steps of:
  transmitting an interlock read command message, including an address corresponding to said specified location, from said one commander node to said responder node;
  transmitting an interlock read command confirmation indicating receipt of said interlock read command message from said responder node to said one commander node during the bus cycle reserved by said command arbitration;
  receiving said interlock read and unlock write command messages from said one commander node at said responder node;
  storing said received command messages in an input queue of said responder node;
  removing said stored messages from said input queue;
  generating interlock read and unlock write control and address information in said responder node from said stored command messages;
  responding to said interlock read control information, if said interlock read address information is not stored in a lock storage register of said responder node, by placing said interlock read address information in said lock storage register, setting a lock bit, and storing the contents of a memory array location corresponding to said interlock read address information in a first type of response message in an output queue;
  responding to said interlock read control information, if said interlock read address information is stored in said lock storage register, by placing a locked code in a second type of response message in said output queue;

responding to unlock write control information by writing data in said memory array and, if said unlock write address information is stored in said lock storage register, resetting said lock bit; and transmitting to said one commander node, during a bus cycle reserved by said response arbitration, said response message stored in said output queue.

* * * * *